(12) United States Patent
Berger et al.

(10) Patent No.: US 10,817,856 B2
(45) Date of Patent: Oct. 27, 2020

(54) SYSTEM AND METHOD FOR MANAGING RECURRING PAYMENTS OVER A PAYMENT NETWORK

(71) Applicant: MASTERCARD INTERNATIONAL INCORPORATED, Purchase, NY (US)

(72) Inventors: Benjamin M. Berger, Rye Brook, NY (US); Amarildo Gjondrekaj, Yonkers, NY (US); Mark Savoye, Hartsdale, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 89 days.

(21) Appl. No.: 16/023,473

(22) Filed: Jun. 29, 2018

(65) Prior Publication Data

US 2020/0005259 A1    Jan. 2, 2020

(51) Int. Cl.
*G06Q 20/10* (2012.01)
*G06Q 20/24* (2012.01)
*G06Q 30/02* (2012.01)
*G06Q 20/34* (2012.01)
*G06Q 20/22* (2012.01)

(52) U.S. Cl.
CPC .......... *G06Q 20/102* (2013.01); *G06Q 20/24* (2013.01); *G06Q 20/29* (2013.01); *G06Q 20/351* (2013.01); *G06Q 30/0239* (2013.01)

(58) Field of Classification Search
CPC .................................................. G06Q 20/102
See application file for complete search history.

(56) References Cited

U.S. PATENT DOCUMENTS

| 7,590,565 B2 * | 9/2009 | Ward | G06Q 10/08 705/26.8 |
| 2017/0148020 A1 * | 5/2017 | Vienravee | G06Q 20/325 |

FOREIGN PATENT DOCUMENTS

WO    WO-2010135157 A2 *    11/2010    ............. G06Q 30/02

OTHER PUBLICATIONS

"Visa, Verified by Visa Acquirer and Merchant Implementation Guide, May 2011, pp. 38-39" (Year: 2011).*

* cited by examiner

*Primary Examiner* — Hani M Kazimi
*Assistant Examiner* — Adam Hilmantel
(74) *Attorney, Agent, or Firm* — Budzyn IP Law, LLC

(57) ABSTRACT

The subject invention advantageously allows a merchant to provide an override payment option, as an enticement, to pre-pay all or a portion of a series of recurring payments. With respect to recurring payments, the subject invention allows a merchant to alter pricing, if necessary, and/or to charge beyond a fixed term, e.g., to maintain a subscription. The invention includes monitoring payment requests made on a recurring payment basis over a payment network to ensure that any override payment is being properly accounted for along with any adjusted pricing and/or additional payments. This unconventional processing is not provided for with standard recurring payment systems.

2 Claims, 4 Drawing Sheets

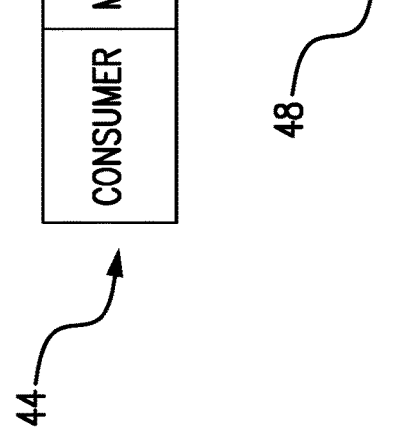

SYSTEM AND METHOD FOR MANAGING RECURRING PAYMENTS OVER A PAYMENT NETWORK

FIELD OF THE INVENTION

The present invention relates to an improved system and method for managing recurring payments.

BACKGROUND OF THE INVENTION

Authorized recurring payments benefit consumers and merchants by automating payment for goods and/or services the consumer has previously agreed to pay for on a regular and recurring basis. A recurring payment may be a fixed amount (e.g., for an annual subscription), or it may be a variable amount based upon usage.

To take advantage of authorized recurring payments, the consumer must provide authorization to the merchant to automatically process the recurring payment and access the consumer's designated payment method for the authorized amount. Authorized recurring payments are then processed by the merchant at a predefined frequency or when the balance in the account reaches a certain threshold. Typical examples include subscription services like NetFlix®, Easy-Pass®, or PlayStation® LinkedIn® annual memberships. The consumer benefits by maintaining continuity of service with ensured payment of service/membership fees. The merchant benefits from guaranteed and regular payment of service/membership fees.

Recurring payments may be difficult for merchants to manage, particularly where consumers have pre-authorized a fixed number of recurring payments at fixed amounts. Changes may occur in pricing which can be validly passed onto a consumer. Also, there may be need to maintain charges beyond the authorized term.

Present recurring payment arrangements are also restrictive in price structure, typically, providing for fixed-amount charges for a fixed term. To entice consumers, flexibility in structuring payment may be useful.

A system has been developed by the Assignee herein whereby a recurring payment management system is provided allowing for real-time consumer confirmation of recurring payment requests. In particular, U.S. patent application Ser. No. 15/718,223, filed Sep. 28, 2017, to the Assignee herein, discloses a recurring payment management system that identifies recurring payment requests, checks the recurring payment requests against a database of stored details of authorized recurring payments, and transmits an authorization request to a consumer where a requested recurring payment request is not in accordance with the stored details. This system allows a consumer to authorize or deny the payment request. U.S. patent application Ser. No. 15/718,223 is incorporated by reference herein in its entirety.

SUMMARY OF THE INVENTION

The present invention is directed to a system and method for managing a recurring payment arrangement between a merchant and a consumer over a payment network. In a first aspect, the subject invention includes a method for managing recurring payments over a payment network, the method comprising:

generating a payment graphical user interface for authorizing payment by a user, the payment graphical user interface allowing for authorization by the user to pay recurring payments in favor of a merchant, the payment graphical user interface providing a selectable feature to enable an override payment option whereby the user authorizes payment, from a user-designated account which is accessible by the payment network, of an override payment in lieu of one or both of a quantity and amount of the recurring payments, the override payment representing one or more of: (i) a fixed number of the recurring payments, each at a determined amount; and (ii) a reduction in an amount of at least a portion of the recurring payments;

storing, in a database, data structures which associate the user, the merchant, and, details relating to the override payment, wherein, the details relating to the override payment include one or more of the fixed number of the recurring payments, the determined amount, and the reduction in the amount of the at least portion of the recurring payments;

reviewing electronically formatted payment-related messages transmitted over the payment network to identify flags indicating the electronically formatted payment-related messages which are on a recurring payment basis, such being recurring-payment payment requests;

parsing a first identified recurring-payment payment request to determine a first payment requestor and a first payor;

comparing the first payment requestor and the first payor to the merchants and the users contained in the data structures to identify data structures which each include both the first payment requestor and the first payor;

for each of the identified data structures, applying the details of the associated override payment so that, if the first identified recurring-payment payment request falls within the fixed number of the recurring payments represented by the override payment, then, comparing a payment amount requested in the first identified recurring-payment payment request with the determined amount so that, if the payment amount requested in the first identified recurring-payment payment request is no greater than the determined amount, declining the first identified recurring-payment payment request; or, if the payment amount requested in the first identified recurring-payment payment request is greater than the determined amount, generating a card-not-present payment request on the payment network in favor of the merchant for a difference between the payment amount requested in the first identified recurring-payment payment request and the determined amount;

if the first identified recurring-payment payment request does not fall within the fixed number of the recurring payments represented by the override payment, generating a card-not-present payment request on the payment network in favor of the merchant for the payment amount requested in the first identified recurring-payment payment request.

The subject invention advantageously allows a merchant to provide an override payment option, as an enticement, to pre-pay all or a portion of a series of recurring payments. With respect to recurring payments, the subject invention allows a merchant to alter pricing, if necessary, and/or to charge beyond a fixed term, e.g., to maintain a subscription. The invention includes monitoring payment requests made on a recurring payment basis over a payment network to ensure that any override payment is being properly accounted for along with any adjusted pricing and/or additional payments. This unconventional processing is not provided for with standard recurring payment systems.

These and other features of the invention will be better understood through a study of the following detailed description and accompanying drawings.

BRIEF DESCRIPTION OF THE DRAWINGS

FIG. 2 depicts a representative graphical user interface useable with the subject invention;

FIG. 3 is a schematic of a data structure useable with the subject invention;

FIG. 4 is a schematic of an electronically formatted payment-related message useable with the subject invention;

DETAILED DESCRIPTION OF THE INVENTION

Figure 1:
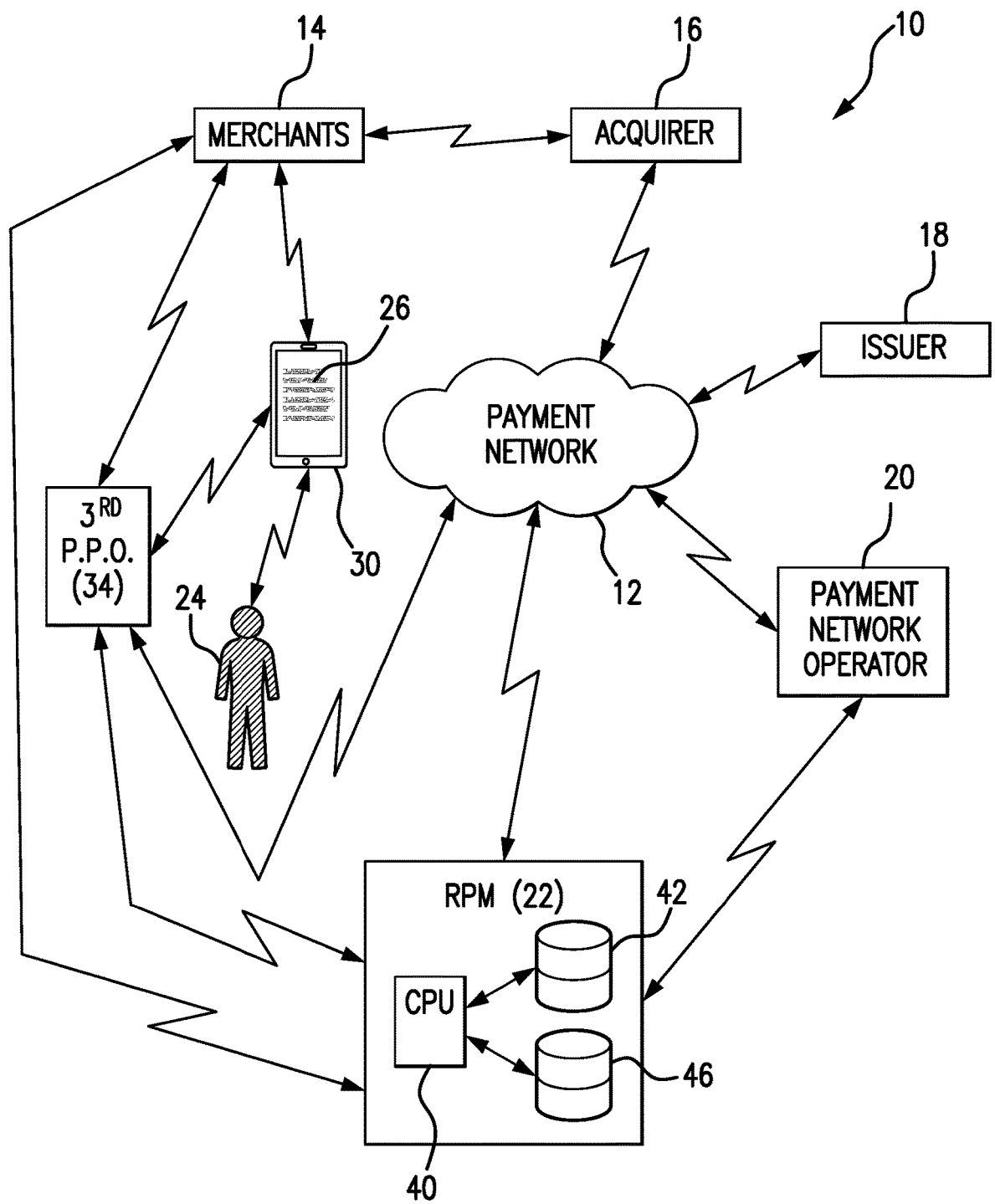
FIG. 1 is a schematic of a system formed in accordance with the subject invention.

With reference to FIG. 1, a system 10 is provided for managing recurring payments over a payment network 12. As used herein, a "payment network" is an electronic network configured to route electronically formatted payment-related messages. As used herein, "electronically formatted payment-related messages" are electronically transmittable strings of data elements or characters having predefined definitions to facilitate electronic payment (e.g., debit or credit payments) on a payment network. "Electronically formatted payment-related messages" are formatted in accordance with recognized standards, such as those provided by NACHA or ISO 8583, or any equivalents, now known or later-developed. Examples of payment networks include the ACH (Automated Clearing House) network, Mastercard Banknet Network, and VisaNet. It is understood that payment networks are special purpose computer networks that include hardware and software components configured to route and process electronically formatted payment-related messages in high volume, and in a secure manner, including routing between consumers, merchants, acquirers, issuers, and, third-parties, as needed, for authorizing payment, denying payment, settling payments, and so forth. Components of payment networks are not publicly accessible.

Within the system 10, the payment network 12 includes interfaces with one or more merchants 14, one or more acquirers 16, one or more issuers 18, at least one payment network operator 20, and at least one recurring payment management (RPM) system 22. The disclosure herein shall discuss various actors and components in the singular, understanding that a plurality may be possible.

For a consumer 24 to interact with the system 10, a graphical user interface (GUI) 26 may be provided. With reference to FIG. 2, the GUI 26 may be presented to the consumer 24 in the form of a webpage 28 accessible by a browser on a web-enabled device 30 used by the consumer 24, including, but not limited to, a computer, laptop, notebook, pad, smartphone, and so forth. The webpage 28 may be accessed from a website maintained by, or on behalf of, the merchant 14. The webpage 28 may be maintained on one or more servers or computers remotely or internally. Additionally, or alternatively, the webpage 28 may be maintained by a third-party payment organization 34 authorized to collect payment on behalf of the merchant 14. With selection by the consumer 24 of an engageable feature (e.g., a clickable button, pull-down, etc.) on the merchant website, the consumer 24 may be directed away from the merchant website to the webpage 28, or the webpage 28 may be presented in a pop-up or frame related to, or separate from, the merchant website. A further option is to provide the consumer 24 with a hyperlink that directs the consumer 24 to the webpage 28, whether maintained by the merchant 14 or the third-party payment organization 34.

The GUI 26 may present fillable fields 36 for collecting data from the consumer 24 regarding payment of a series of recurring payments. With this arrangement, the consumer 24 may authorize payment of a series of recurring payments and designate an account for payment of the related recurring payments, particularly an account associated with the payment network 12.

With the subject invention, the GUI 26 may include a selectable override payment feature 38 that provides an override payment option. The selectable feature 38 may be a clickable box, pull-down, etc. The override payment option allows the consumer 24 to make an override payment in lieu of one or both of a quantity and amount of the series of recurring payments. The override payment, when made, represents one or more of: (i) a fixed number of the recurring payments, each at a determined amount; and, (ii) a reduction in an amount of at least a portion of the recurring payments.

Thus, for example, as shown in FIG. 2, with the override payment option, a consumer may pre-pay for twelve months to receive a 10% reduction in cost. With this arrangement, for example, a series of recurring payments may be presented, with twelve consecutive monthly payments each of a fixed amount, such as $30.00. As such, the series of recurring payments will total $360.00. With the override payment option, the consumer 24 may make a one-time payment of $324.00 ($36.00 savings) in favor of the merchant 14 representing the twelve payments of $30.00. Accordingly, the override payment may represent a fixed number of recurring payments, with a determinable value of each payment (e.g., one-time payment of $324.00 represents twelve monthly payments of $30.00 each). With the previous example, the override payment would represent twelve monthly payments in the reduced amount of $27.00 each. Likewise, the override payment may allow for payment of a lesser number of payments at one-time to represent full payment of the series if recurring payments (e.g., allow for payment of ten months to pay for twelve months). The override payment may be based on one or both of a reduction in amounts of payments and/or number of payments.

The override payment is made with the consumer 24 utilizing a designated account over the payment network 12, e.g., an account based on details provided in the fillable fields 36. It is possible to have a further webpage, re-direction, etc. be utilized to provide a secondary graphical user interface for collecting details from the consumer 24 related to the designated account.

The system 10 described herein may be administered by the payment network operator 20. The system 10 may be administered in whole or in part by other parties such as an acquirer, and/or third-party payment processors. As shown in FIG. 1, the merchant 14, the acquirer 16, the payment network operator 20, and the third-party payment organization 34 may be connected via the payment network 12, as is known in the art, and/or have connections outside of the payment network 12.

With reference to FIG. 1, the RPM system 22 includes one or more computing processing units (CPUs) 40 along with one or more associated databases 42. With the consumer 24 selecting the override payment option and making such payment in favor of the merchant 14, the details of the override payment are stored in data structures 44 of the database 42. As shown in FIG. 3, the data structures 44 associate the consumer 24, the merchant 14, and details related to the override payment. The details related to the override payment include one or more of: the fixed number of the recurring payments represented by the override payment; the determined amount of the fixed number of the recurring payments (i.e., the original, unreduced amount of the recurring payments); and, the reduction in the amount of the recurring payments (i.e, the reduced amount of the recurring payments as a result of payment of the override payment).

The CPU 40 is connected to the payment network 12 so as to review electronically formatted payment-related messages transmitted thereacross, particularly, from the acquirer 16 to the issuer 18. The payment network operator 20 may operate and maintain the RPM system 22, including receiving details regarding override payments. Such details may be transmitted to the RPM system 22 from the merchant 14 or the third-party payment organization 34, as the recipients of such details, directly or indirectly. The details may be transmitted in real-time, upon receipt, or as delayed transmission, e.g., in batch format.

The CPU 40 includes computer instructions for reviewing electronically formatted payment-related messages to identify flags (i.e., data elements) that indicate that the related payment message is on a recurring payment basis. The electronically formatted payment-related messages may be intercepted by the CPU 40 and, thus, halted from further processing on the payment network 12 to allow for the review. A buffer or other electronic storage 46 may be provided to allow for intercepted electronically formatted payment-related messages to collect in waiting to be parsed by the CPU 40.

The CPU 40 need not act further on payment messages that are not on a recurring payment basis. Non-recurring-payment payment requests may be released by the CPU 40 on the payment network 12 for further processing (e.g., further routing to the issuer 18).

With the payment requests identified as being on a recurring-payment basis, the CPU 40 includes computer instructions that allow for parsing. FIG. 4 shows schematically an electronically formatted-payment message 48. The formatting, as indicated above, is standardized for processing on the payment network 12. The payment message 48 is parsed by the CPU 40 to identify data elements 48A relating to a designated payment requestor and data elements 48B relating to a designated payor. The CPU 40 includes further computer instructions to compare the designated payment requestor and the designated payor with the data structures 44 to identify any of the data structures 44 that each include the designated payment requestor (e.g., the merchant 14) and the designated payor (e.g., the consumer 24). Each of the data structures 44 that includes both the designated payment requestor and the designated payor may have an override payment that is relevant to the associated payment request. The process for evaluating the applicability of an override payment is discussed below.

It is noted that the payment message 48 may include additional data elements, such a payment request amount (48C), and a recurring payment flag (48D).

Figure 5:
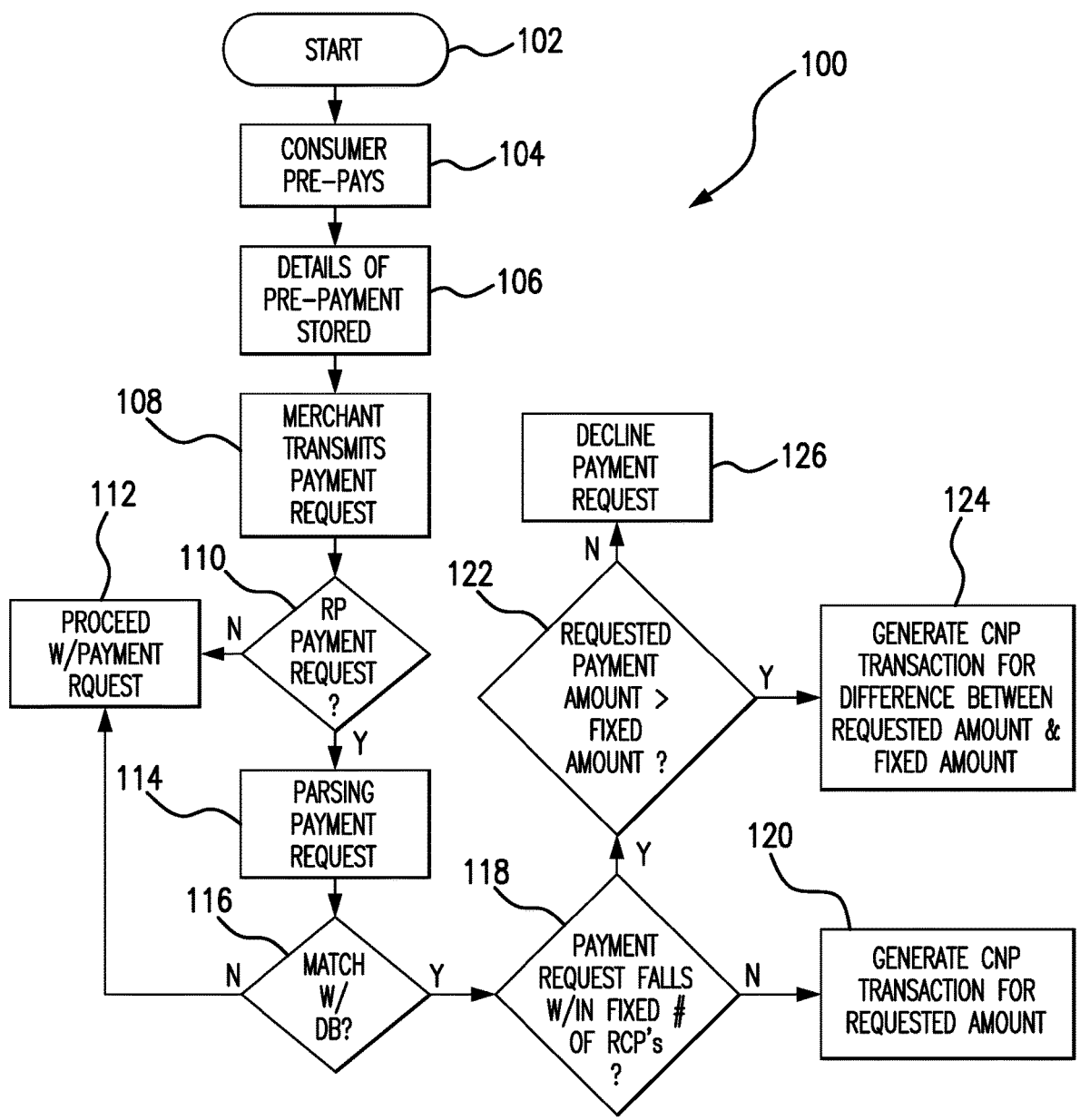
FIG. 5 is a flowchart of a method in accordance with the subject invention; and, FIG. 6 is a schematic of a computing processing unit useable with the subject invention.

FIG. 5 depicts a method 100 in accordance with the subject invention. The method 100 begins (step 102) with presentment to the consumer 24, on behalf of the merchant 14, a request for authorization to charge a series of recurring payments against an account designated by the consumer, along with an override payment option. The consumer 24 may proceed with the override payment (step 104) with the details of the override payment being stored (step 106). Without any changes to the merchant's 14 internal systems, the method 100 allows for reviewing of payment requests (as electronically formatted payment-related messages) transmitted by the merchant 14 over the payment network 12 to determine which are on a recurring payment basis, and, if so, if, and to what extent, override payments apply. Thus, the merchant 14 transmits payment requests as electronically formatted payment-related messages onto the payment network 12 in normal fashion (step 108). The RPM system 22 reviews payment requests transmitted over the payment network 12 to identify payment requests that include flags indicating that the payment request is on a recurring-payment basis (step 110). Flags may be included in the electronically formatted payment-related messages as a designated element having a particular location in the data string. Where a payment request has no flag, the method 100 allows for the payment request to continue on the payment network 12 for normal processing (step 112).

If a flag is present, the related payment request is parsed (step 114) by the CPU 40 to determine the associated payment requestor and the associated payor. The step 114 determines the party requesting payment and the party from whom payment is requested.

In step 116, the identified payment requestor and payor are compared against the data structures 44 to identify the data structures 44 that each include both the identified payment requestor and payor. For each of the identified data structures 44, the details of the associated override payment are applied to determine relevance, if any. In particular, the method 100 determines whether the payment request falls within the fixed number of recurring payments represented by the override payment (step 118). Here, the method 100 examines whether the payment request is within the number of recurring payments represented by the override payment. For example, if the payment request is made six months after the override payment which represented twelve months payment, the payment request is within the number of recurring payments represented by the override payment. In contrast, if the payment request is made thirteen months after the override payment which represented twelve months payment, the payment request is outside the number of recurring payments represented by the override payment. If it is determined that the payment request is outside the number of recurring payments represented by the override payment, a card-not-present payment request is generated by the CPU 40 for the amount in the payment request on behalf of the consumer 24 in favor of the merchant 14 (step 120). The card-not-present payment request may be charged against the same account as utilized by the consumer 24 to pay for the override option. As used herein, a "card-not-present payment request" is an electronic payment request in the form of an electronically formatted payment message, transmittable over the payment network 12, which authorizes a charge against a designated payment account without involvement of the consumer 24.

If, at step 118, it is determined that the payment request is within the number of recurring payments represented by the override payment, the method 100 proceeds to step 122 where the amount of the payment request is compared to the value of the recurring payment as represented by the override payment. For example, the payment request may be for an amount of $33.00, where the override payment represented payment of twelve payments of $30.00, each. If the payment request is greater than the represented amount, a card-not-present payment request is generated by the CPU 40 on behalf of the consumer 24 in favor of the merchant 14 for an amount equal to the difference between the requested amount and the value of the recurring payment as represented by the override payment (with the given example, the difference would be $3.00) (step 124). If the payment request is not greater than the requested amount, the payment request is denied (step 126), with a message being transmitted by the CPU 40, e.g., via the payment network 12, to the merchant 14. The card-not-present payment request may be charged against the same account as utilized by the consumer 24 to pay for the override option.

Figure 6:
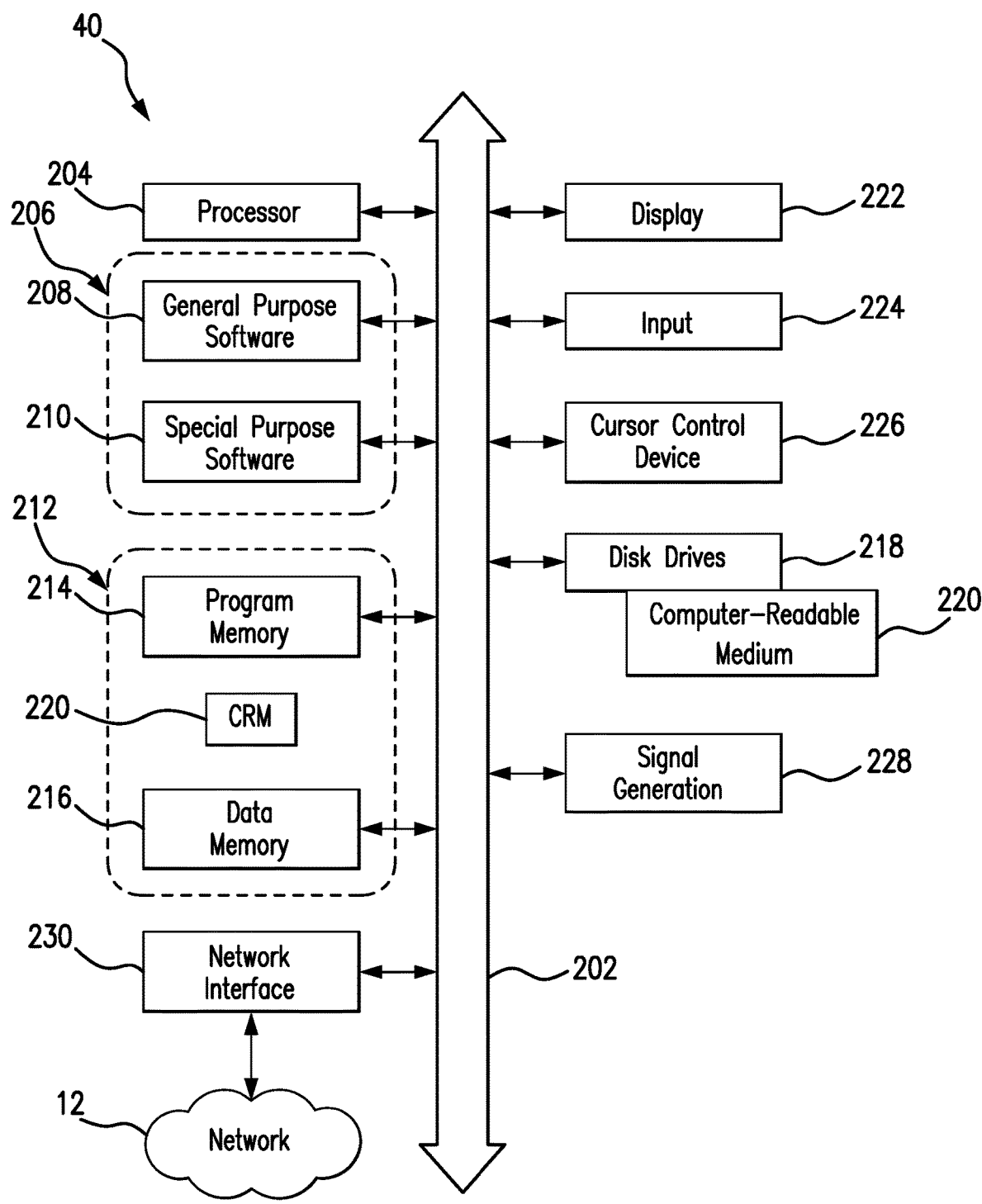

Referring next to FIG. 6, the CPU 40 in accordance with embodiments of the present invention will now be discussed in more detail. The CPU 40 may be a general purpose computing device having a plurality of devices and components operably connected over a bus 202. The CPU 40 has one or more processors 204. Although the CPU 40 of the present invention is discussed as having a single processor 204, a computer or server having multiple processor, either separate or integrated in a multi-core processor, for example, are also contemplated by and within the scope and spirit of the present invention. Reference to processor in the singular herein shall be interpreted to include any variation and number of processors. The processor 204 is operable by at least one program of instructions 206 comprising general purpose software 208 to carry out functions that enable the CPU 40 to interface with its various hardware components (discussed further below), and to interface and communicate with other devices. The processor 204 of the present invention is also operable by at least one program of instructions 206 comprising special purpose software 210 to carry out aspects of the present invention. The general purpose software 208 and special purpose software 210 may be stored on the CPU 40 in memory 212 that may comprise program memory 214 and data memory 216, or it may be stored on one or more disk drives 218 comprised of a computer-readable medium 220, or it may be stored in/on any combination of the foregoing. As used herein, the term "memory" is intended to include all currently known or hereafter developed types of permanent or temporary storage devices or components in a computing device. Exemplary memory types include, by way of illustration and not limitation, Random Access Memory (RAM)—further including Dynamic RAM (DRAM), Static RAM (SRAM), and Direct Rambus DRAM (DRDRAM), Read Only Memory (ROM)—further including Programmable ROM (PROM), erasable PROM (EPROM), and Electrically EPROM (EEPROM), cache memory, hard drives and flash memory.

The CPU 40 may further include a display 222, input device(s) 224 (e.g., a keyboard), cursor control device(s) 226 (e.g., a mouse), signal generation device(s) 228 (e.g., a speaker or remote control), and network interface device(s) 230 that enable the CPU 40 to selectively connect to the payment network 12.

The memory 212 and disk drives 218 each comprise computer-readable medium 220 that may each include a single medium or multiple media (e.g., a centralized or distributed database, and/or associated caches and servers) that store the one or more programs of instructions 206. As used herein, the term "computer-readable medium" means and includes, but is not limited to, solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives that is considered a distribution medium equivalent to a tangible storage medium. Accordingly, the embodiment is considered to include anyone or more of a tangible computer-readable medium or a tangible distribution medium, as listed herein and including art-recognized equivalents and successor media, in which the software implementations herein are stored. The term "computer-readable medium" also means and includes any medium that is capable of storing, encoding, or carrying a set of instructions in the general purpose software 208 and in the special purpose software 210.

Although the present specification may describe components and functions implemented in the embodiments with reference to particular standards and protocols, the disclosed embodiments are not limited to such standards and protocols.

In accordance with various embodiments, the present invention may be implemented as one or more software programs running on one or more computing devices and one or more computer processors. Dedicated hardware implementations including, but not limited to, application specific integrated circuits, programmable logic arrays and other hardware devices can likewise be constructed to implement the present invention. Furthermore, alternative software implementations including, but not limited to, distributed processing or component/object distributed processing, parallel processing, or virtual machine processing can also be constructed to implement the present invention.

As used herein, the term "connectable," and derivatives thereof, refers to various states of connection between electronic devices. For example, "connectable" refers to a physical connection between electronic devices, a wireless connection between electronic devices, a combination of a physical and wireless connection between electronic devices, a transient or episodic connection between electronic devices. As used herein the term "connectable" also refers to various states of connectivity between electronic devices such as, by way of non-limiting example, when electronic devices are not connected, when electronic devices are connecting, and when electronic devices are connected.

Modifications to embodiments of the present invention are possible without departing from the scope of the invention as defined by the accompanying claims. Expressions such as "including," "comprising," "incorporating," "consisting of," "have," "is," used to describe and claim the present invention are intended to be construed in a non-exclusive manner, namely allowing for articles, components or elements not explicitly described herein also to be present. Reference to the singular is to be construed to relate to the plural, where applicable.

Although specific example embodiments have been described, it will be evident that various modifications and changes may be made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for managing recurring payments over a payment network, the system comprising:

a database containing data structures which associate a user, a merchant, and, details relating to a completed override payment made to the merchant in lieu of one or both of a quantity and amount of recurring payments, the override payment representing pre-payment in value for a fixed number of the recurring payments, each at a determined amount, wherein, the details relating to the override payment include the fixed number of the recurring payments, and the determined amount; and, a recurring payment management system having one or more computing processing units configured to:

review data elements of electronically formatted payment-related messages transmitted over a payment network to identify flags, included in the data elements, indicating the electronically formatted payment-related messages which are on a recurring payment basis, such being recurring-payment payment requests;

intercept on the payment network, and place into an electronic storage separate from the database, a first identified recurring-payment payment request so as to be halted from further processing on the payment network;

parse the data elements of the first identified recurring-payment payment request to determine a first payment requestor and a first payor;

compare the first payment requestor and the first payor to the merchants and the users contained in the data structures to identify data structures which each include both the first payment requestor and the first payor;

if the comparing the first payment requestor and the first payor to the merchants and the users contained in the data structures does not identify any of the data structures as including both the first payment requestor and the first payor, release the first identified recurring-payment payment request to continue with further processing on the payment network;

if the comparing the first payment requestor and the first payor to the merchants and the users contained in the data structures identifies any of the data structures as including both the first payment requestor and the first payor, for each of the identified data structures, apply the details of the override payment associated with the respective identified data structures, wherein the applying the details includes:

a) if the first identified recurring-payment payment request falls within the fixed number of the recurring payments represented by the override payment, then, compare a payment amount requested in the first identified recurring-payment payment request with the determined amount, the comparing of the payment amount includes:

i. if the payment amount requested in the first identified recurring-payment payment request is no greater than the determined amount, decline the first identified recurring-payment payment request; or, ii. if the payment amount requested in the first identified recurring-payment payment request is greater than the determined amount, generate a card-not-present payment request on the payment network in favor of the merchant for a difference between the payment amount requested in the first identified recurring-payment payment request and the determined amount;

b) if the first identified recurring-payment payment request does not fall within the fixed number of the recurring payments represented by the override payment, generate a card-not-present payment request on the payment network in favor of the merchant for the payment amount requested in the first identified recurring-payment payment request.

2. A system as in claim 1, wherein the one or more computing units are connected to the payment network via a network connection.

* * * * *